S. STEINBECK.
STONE-DRESSING AND SAWING-MACHINE.

No. 172,517. Patented Jan. 18, 1876.

WITNESSES:
Francis McArdle,
John Goethals

INVENTOR:
S. Steinbeck
BY
ATTORNEYS.

UNITED STATES PATENT OFFICE.

SILAS STEINBECK, OF CHICAGO, ILLINOIS.

IMPROVEMENT IN STONE DRESSING AND SAWING MACHINES.

Specification forming part of Letters Patent No. 172,517, dated January 18, 1876; application filed December 27, 1875.

*To all whom it may concern:*

Be it known that I, SILAS STEINBECK, of Chicago, in the county of Cook and State of Illinois, have invented a new and Improved Stone Sawing and Dressing Machine, of which the following is a specification:

The invention consists of rotary sawing and surfacing cutters, having recesses or notches of peculiar form, to admit the sand between them and the stone; and it also consists of improvements in means for feeding the sand to the cutters, all as hereinafter described.

Figure 1:
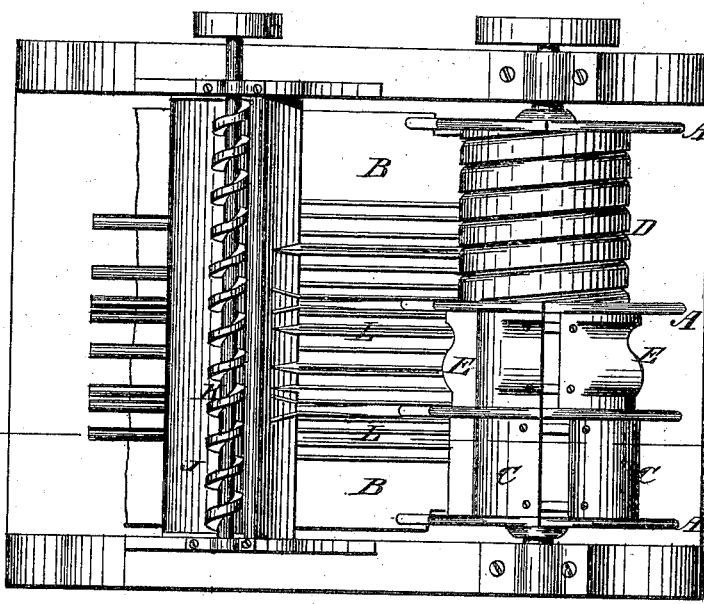
Figure 2:
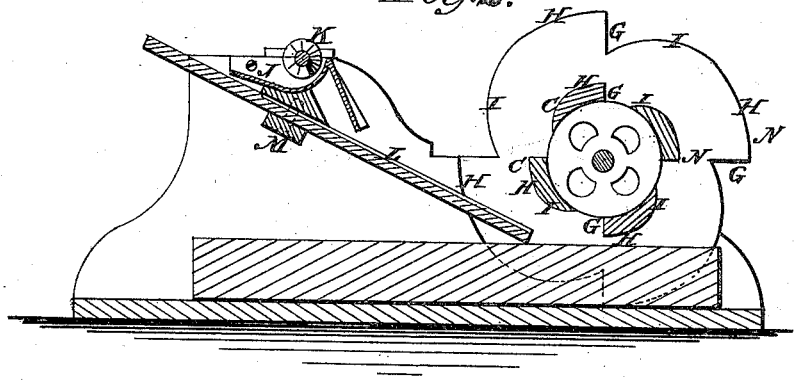

Figure 1 is a plan view of my improved sawing and dressing machine, and Fig. 2 is a sectional elevation taken on the line $xx$ of Fig. 1.

Similar letters of reference indicate corresponding parts.

A represents the saw-cutters for separating the stone B into pieces. C and D represent surfacing-cutters, and E represents molding-cutters, all of which are made in sections, and detachably connected to the drum or shaft F, to be taken off for changing by putting on others of different forms for different kinds of work. These cutters all have recesses G in the cutting or dressing faces, to admit the sand between the operative faces and the stone. Sand-recesses are formed by the radial line H at the front of the recess, as the cutters run, and the curved line I at the back, the latter line merging in the circular cutting or dressing surface N of the cutter, about half-way to the line H of the next recess behind, so that the sand falling or otherwise entering the recesses will be, by the action of the cutters on the stone, worked along to the place on the cutters where they come in contact with the stone, and be by the shape of the cutters forced along the surface of the stone, on which they act so as to be very effective.

These recesses may be parallel to the axis of the stone, or inclined to it, and in a long surfacing-cutter they may assume the spiral form represented at D, in which case the line I of the recess will act on the stone in a line inclined to the direction in which the stone feeds to the cutters.

To feed the sand to cutters I have it placed in a trough, J, somewhat higher, and a little in advance of the cutters, in which is a slowly-rotating screw, K, which throws the sand over the edge of the trough onto the conductors L, down which it flows to the stone at the cutters. The conductors L are fixed loosely in the support M, so that their lower ends may be free to rise and allow any elevations of the surface of the stone to pass under them freely.

An approved feed mechanism will be used for moving the stone along to the cutters.

Having thus described my invention, I claim as new and desire to secure by Letters Patent—

1. Stone sawing and dressing cutters having recesses G, for admitting the sand to the cutting-surfaces, constructed and arranged on lines H I N, and either parallel or oblique to the axis of the drum or shaft, substantially as specified.

2. The combination of the screw-shaft K and sand-trough L, with the stone-cutters, substantially as specified.

3. The combination of conductors L with the stone-cutters, and the sand trough, and feed-screw, substantially as specified.

SILAS STEINBECK.

Witnesses:
T. B. MOSHER,
ALEX. F. ROBERTS.